United States Patent
Pelletier et al.

(10) Patent No.: US 8,464,539 B2
(45) Date of Patent: Jun. 18, 2013

(54) NOZZLE WITH A PLURALITY OF STACKED PLATES

(75) Inventors: Robert R. Pelletier, Chardon, OH (US); James R. Pavlik, Mentor-On-The-Lake, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 899 days.

(21) Appl. No.: 12/365,378

(22) Filed: Feb. 4, 2009

(65) Prior Publication Data

US 2010/0192585 A1 Aug. 5, 2010

(51) Int. Cl.
- *F02C 1/00* (2006.01)
- *F02G 3/00* (2006.01)
- *B05B 7/06* (2006.01)
- *B05B 1/14* (2006.01)

(52) U.S. Cl.
USPC .............. 60/742; 60/740; 60/746; 239/424.5; 239/555

(58) Field of Classification Search
USPC ................... 60/740, 742, 746, 747; 239/554, 555, 596, 422, 423, 424, 424.5, 428, 239/474, 475, 486, 487, 490, 491, 494, 496, 239/497, 549, 556, 558, 560, 561, 533.12
See application file for complete search history.

(56) References Cited

U.S. PATENT DOCUMENTS

| | | | |
|---|---|---|---|
| 2,959,003 A | 11/1960 | Carlisle et al. | |
| 3,310,240 A | 3/1967 | Grundman | |
| 3,881,701 A | 5/1975 | Schoenman et al. | |
| 4,616,784 A | 10/1986 | Simmons et al. | |
| 4,828,184 A | 5/1989 | Gardner et al. | |
| 5,435,884 A | 7/1995 | Simmons et al. | |
| 5,655,702 A * | 8/1997 | Anderson et al. | 228/159 |
| 5,740,967 A | 4/1998 | Simmons et al. | |
| 5,765,750 A * | 6/1998 | Pace et al. | 239/5 |
| 5,951,882 A | 9/1999 | Simmons et al. | |
| 6,016,969 A | 1/2000 | Tilton et al. | |
| 6,021,635 A | 2/2000 | Gaag et al. | |
| 6,065,692 A | 5/2000 | Brinn, Jr. | |
| 6,173,862 B1 | 1/2001 | Buca et al. | |
| 6,189,214 B1 * | 2/2001 | Skeath et al. | 29/890.142 |
| 6,357,677 B1 * | 3/2002 | Ren et al. | 239/585.4 |
| 6,460,344 B1 | 10/2002 | Steinthorsson et al. | |
| 6,513,724 B1 | 2/2003 | Joseph et al. | |
| 6,533,954 B2 * | 3/2003 | Mansour et al. | 216/100 |
| 6,550,696 B2 * | 4/2003 | Mansour et al. | 239/399 |
| 6,560,964 B2 | 5/2003 | Steinhorsson et al. | |
| 6,698,207 B1 * | 3/2004 | Wiebe et al. | 60/737 |
| 6,763,663 B2 * | 7/2004 | Mansour et al. | 60/740 |

(Continued)

*Primary Examiner* — Ehud Gartenberg
*Assistant Examiner* — Michael B Mantyla
(74) *Attorney, Agent, or Firm* — Renner, Otto, Boisselle & Sklar, LLP

(57) ABSTRACT

A nozzle assembly (10) comprising a first inlet tube (14), a second inlet tube (15), and a nozzle (16). The nozzle (16) is formed from a stack of plates (20-38) which are joined together in face-to-face contact. The plates (20-38) collectively have openings which define a nozzle outlet, a first inlet, a second inlet, a first circuit from the first inlet to the nozzle outlet, a second circuit from the second inlet to the nozzle outlet, and a fluid-outlet chamber through which both the first circuit and the second circuit pass. The nozzle assembly (10) can be used as a fuel injector for a gas turbine engine, with jet fuel being supplied to the first circuit during start-up and low power conditions and jet fuel being supplied to both the first circuit and the second circuit during high power conditions.

14 Claims, 16 Drawing Sheets

U.S. PATENT DOCUMENTS

| | | |
|---|---|---|
| 6,880,340 B2 * | 4/2005 | Saitoh .............................. 60/737 |
| 6,883,332 B2 | 4/2005 | Steinthorsson et al. |
| 6,920,749 B2 | 7/2005 | Mansour et al. |
| 7,083,122 B2 * | 8/2006 | Mansour et al. ............... 239/399 |
| 7,093,776 B2 | 8/2006 | Schneider |
| 2004/0098989 A1 * | 5/2004 | Mansour et al. ................ 60/775 |

* cited by examiner

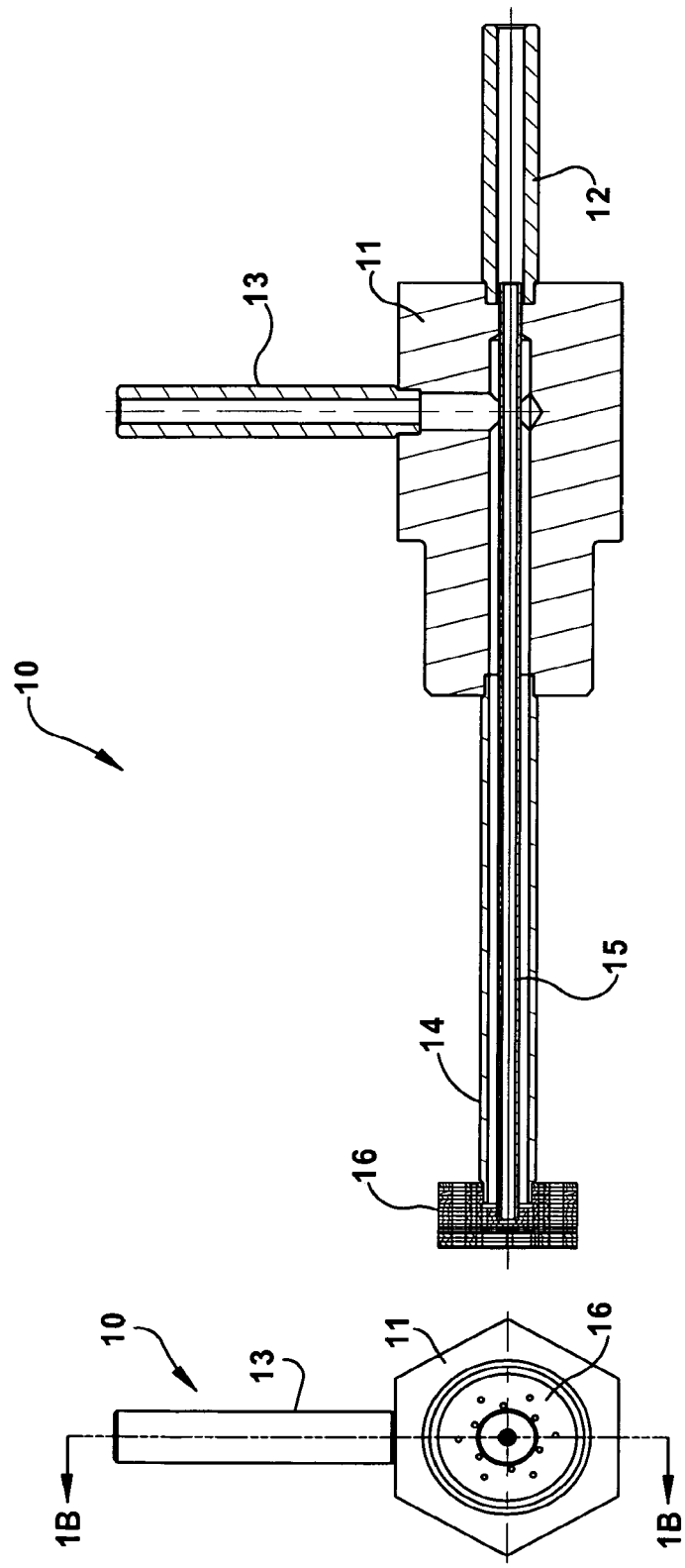

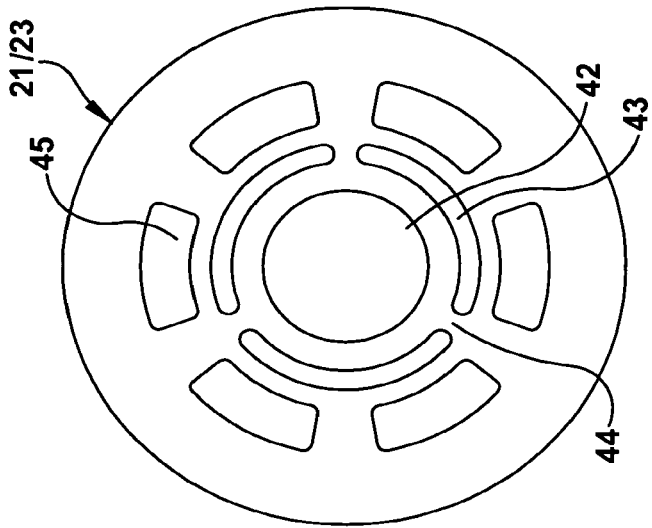
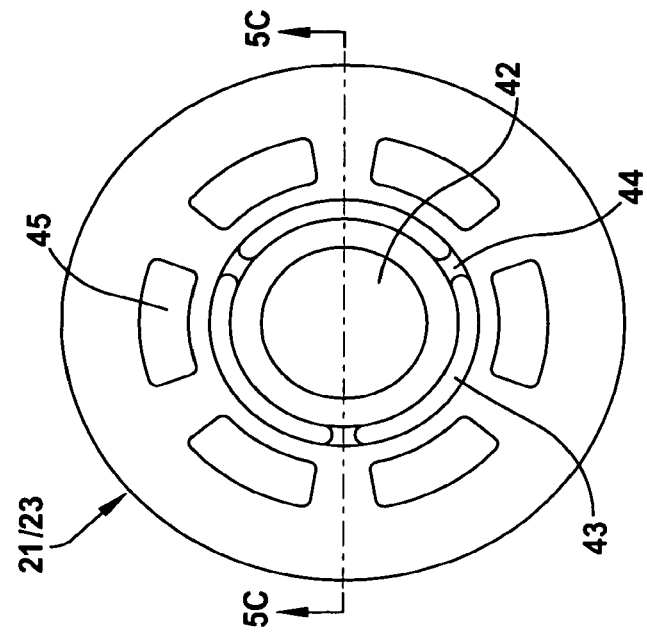
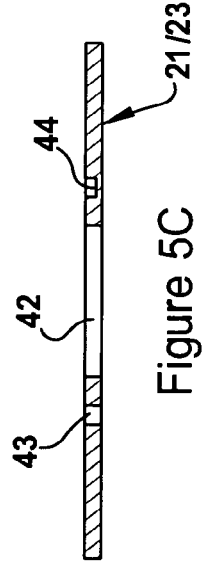
Figure 5A
Figure 5B
Figure 5C

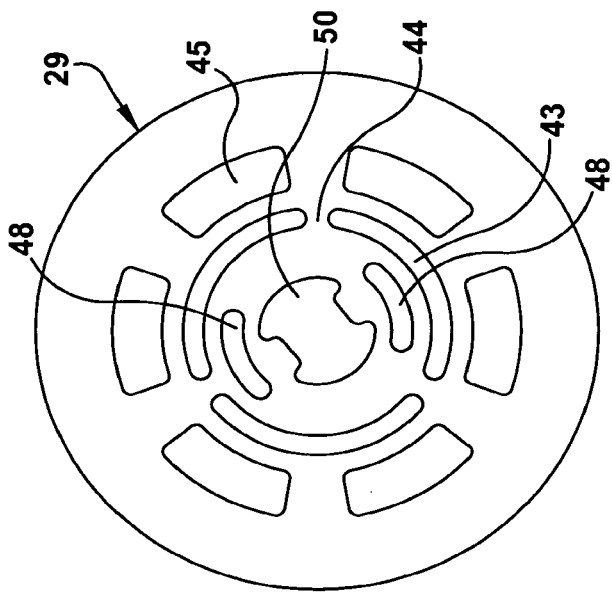
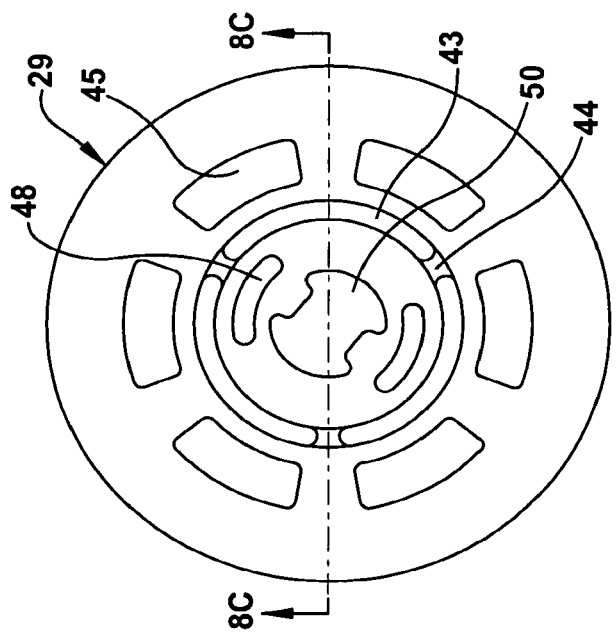

NOZZLE WITH A PLURALITY OF STACKED PLATES

RELATED APPLICATIONS

This application claims priority under 35 U.S.C. §120 to U.S. patent application Ser. No. 11/274,811 filed on Nov. 15, 2005, which claimed priority under 35 U.S.C. §119(e) to U.S. Provisional Patent Application No. 60/719,619 filed on Sep. 22, 2005. The entire disclosures of these applications are hereby incorporated by reference.

FIELD OF THE INVENTION

The present invention relates to nozzle assembly wherein the atomizer nozzle has a dual-orifice design or duplex design with first and second circuits passing through a fluid-outlet chamber prior to being discharged from the nozzle in a desired three-dimensional shape.

BACKGROUND OF THE INVENTION

A nozzle assembly can comprise a nozzle having an outlet, a first inlet, a second inlet, a first circuit from the first inlet to the nozzle outlet, a second circuit from the second inlet to the nozzle outlet, and a fluid-outlet chamber through which both the first circuit and the second circuit pass. Such a two-circuit nozzle assembly can be used, for example, as a fuel injector for a gas turbine engine (e.g., an aircraft engine). In such an application, fuel can be supplied to the first circuit during start-up and low power conditions, and the same or a different fuel can be supplied to both the first circuit and the second circuit during high power conditions. The nozzle can include a set of third circuits through which another fluid is supplied to the fluid-outlet chamber which, in the aircraft engine example, can be air for atomizing purposes.

A nozzle can have a dual-orifice design or a duplex design. In a dual-orifice nozzle, the first circuit and the second circuit have separate swirl chambers, and separate orifices forming the exit from these swirl chambers, upstream of the fluid-outlet chamber. The discharge from a dual-orifice design can have a three-dimensional cone-within-a-cone shape, with the fluid from the first circuit forming the inner cone and the fluid from the second circuit forming the outer cone. (Although sometimes the inner cone and the outer cone intermix and the cone-within-a-cone shape cannot be seen.) In a duplex nozzle, fluid from the first and fluid from the second circuit are intermixed in a common swirl chamber upstream of the fluid-outlet chamber. The intermixed fluids exit from this swirl chamber through a common orifice and are discharged from the nozzle outlet in a single-cone shape.

SUMMARY OF THE INVENTION

The present invention provides a nozzle which has a construction allowing it to be made in an economic, easily replicable manner and/or allowing it to accommodate situations wherein the circuit flow areas are of a relatively small size. The nozzle comprises a stack of plates joined together in face-to-face contact and in a fluid-tight manner. The plates collectively have openings which define a nozzle outlet, a first inlet, a second inlet, a first circuit from the first inlet to the nozzle outlet, a second circuit from the second inlet to the nozzle outlet, and a fluid-outlet chamber. The first circuit and the second circuit both pass through the fluid-outlet chamber.

The first inlet and the second inlet are both positioned upstream of the nozzle outlet, and the first inlet is preferably positioned downstream of the second inlet. In any event, at least one plate is, and preferably a plurality of plates are, positioned between the plate having the first-inlet-defining opening and the plate having the second-inlet-defining opening. Each of the plates upstream of the second-inlet-defining plate can have an opening for receipt of an inlet tube supplying fluid for the second circuit, and each of the plates between the first-inlet-defining plate and the second-inlet-defining plate can have an opening for receipt of another inlet tube supplying fluid for the first circuit.

The nozzle of the present invention can be constructed to have a dual-orifice design or a duplex design. If the nozzle has a dual-orifice design, some of the plates upstream of the fluid-outlet chamber can have openings and/or grooves which form a swirl chamber in the first circuit and a separate swirl chamber in the second circuit. If the nozzle has a duplex design, some of the plates upstream of the fluid-outlet chamber can have openings and/or grooves which form a common swirl chamber through which both the first circuit and the second circuit pass.

A nozzle assembly incorporating the nozzle of the present invention can be used, for example, as a fuel injector for a gas turbine engine (e.g., an aircraft engine). In such an application, fuel can be supplied to the first circuit during start-up and low power conditions, and fuel can be supplied to the second circuit during high power conditions. Air can be passed through a third circuit (and preferably a plurality of third circuits) and the air can interact with the fuel in the fluid-outlet chamber for atomizing purposes.

A plurality of the nozzles may be made from a stack of sheets which includes a sheet for each plate in the nozzle. Each sheet includes a plurality of plate areas (i.e., the number of plate areas equals the number of nozzles to be made from the stack) having the openings/grooves of the corresponding plate formed therein. The sheets are stacked in the same sequential order as the corresponding plates in the nozzle and joined together. Thereafter, the plate areas can be separated from the joined-together sheets to form the individual nozzles.

These and other features of the invention are fully described and particularly pointed out in the claims. The following description and drawings set forth in detail certain illustrative embodiments of the invention, these embodiments being indicative of but a few of the various ways in which the principles of the invention may be employed.

DRAWINGS

FIGS. 1A and 1B are downstream and sectional views of a nozzle assembly 10 according to the present invention.

Figure 4B:
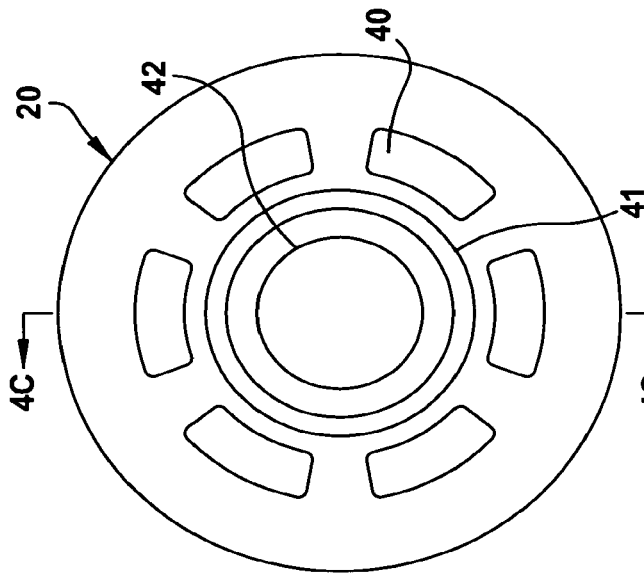
Figure 4A:
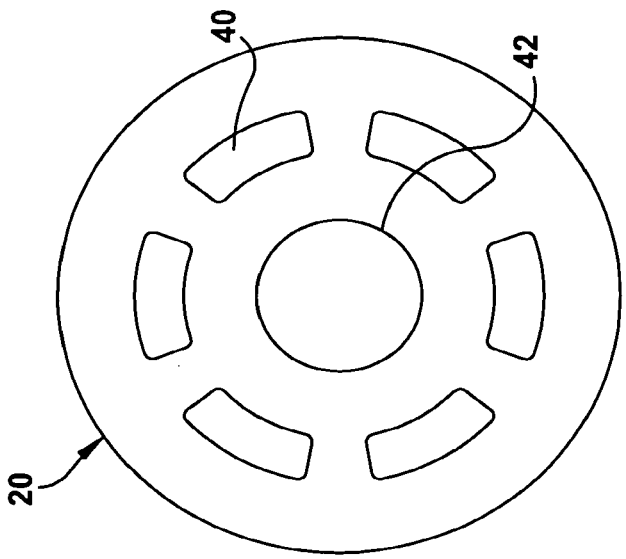
Figure 4C:
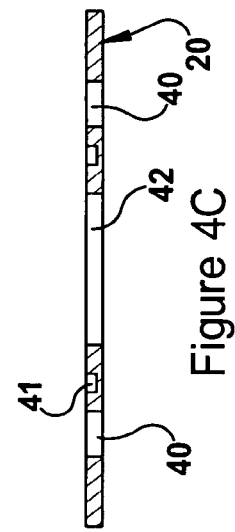

FIGS. 4A, 4B, and 4C are upstream, downstream, and sectional views of plate 20.

FIGS. 5A, 5B, and 5C are upstream, downstream, and sectional views of plate 21/23.

Figure 5E:
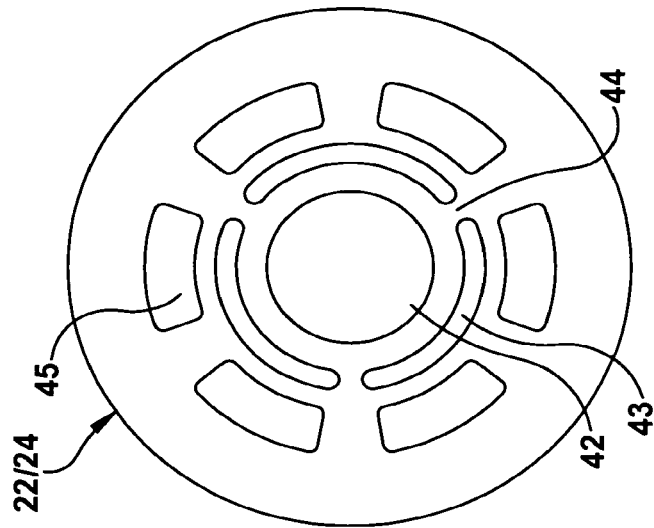
Figure 5D:
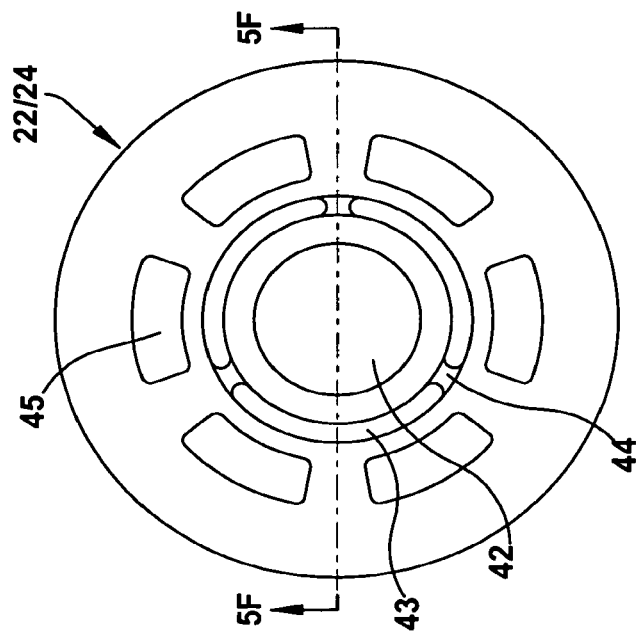
Figure 5F:
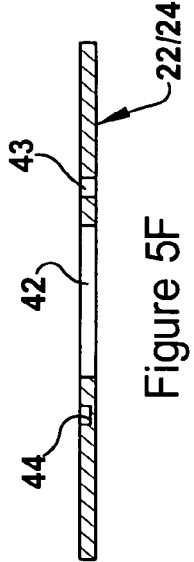

FIGS. 5D, 5E, and 5F are upstream, downstream and sectional views of plate 22/24.

Figure 6B:
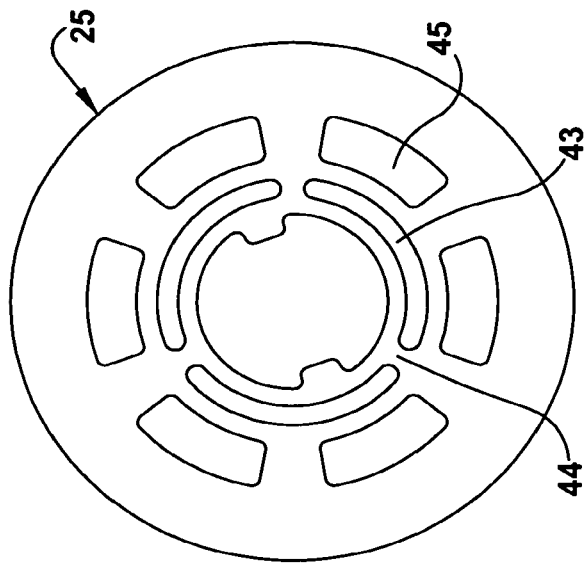
Figure 6A:
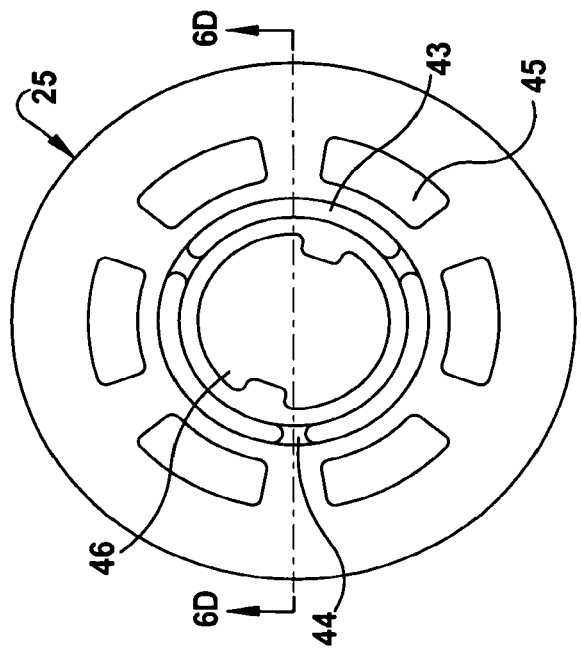
Figure 6C:
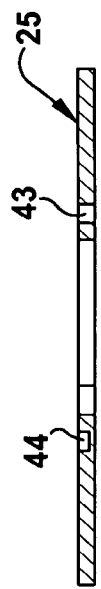

FIGS. 6A, 6B, and 6C are upstream, downstream and sectional views of plate 25.

Figure 7B:
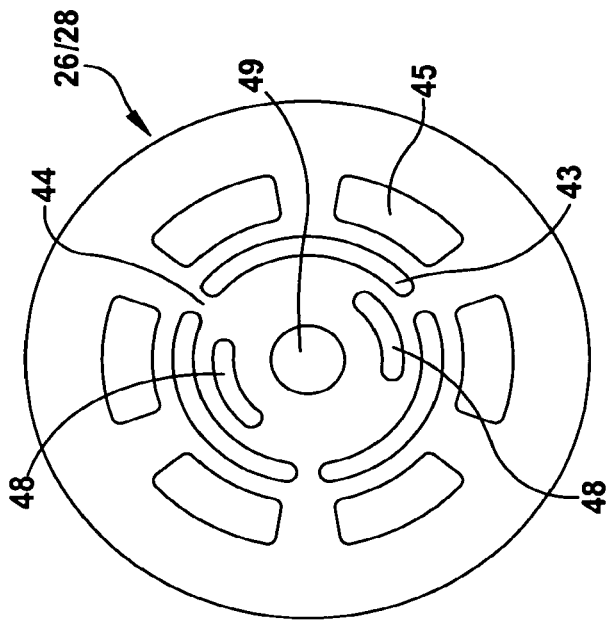
Figure 7A:
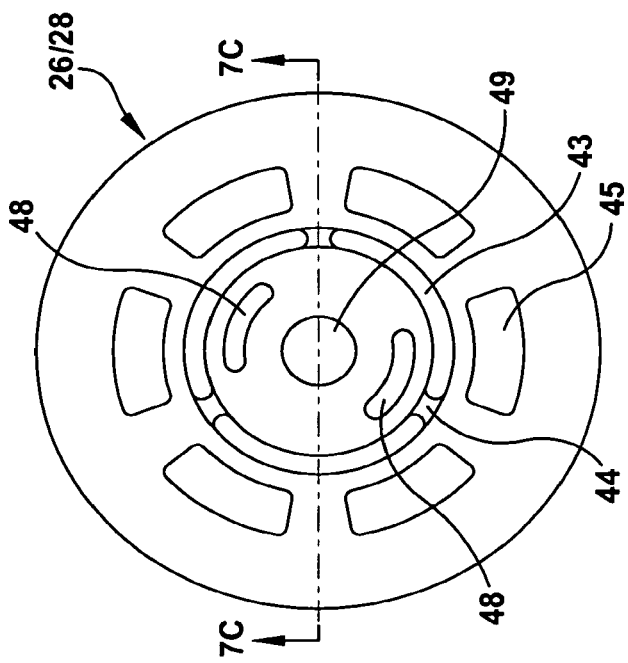
Figure 7C:
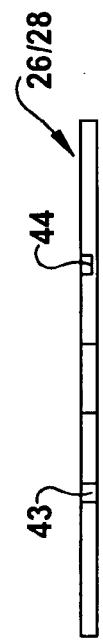

FIGS. 7A, 7B, and 7C are upstream, downstream and sectional views of plate 26/28.

Figure 7E:
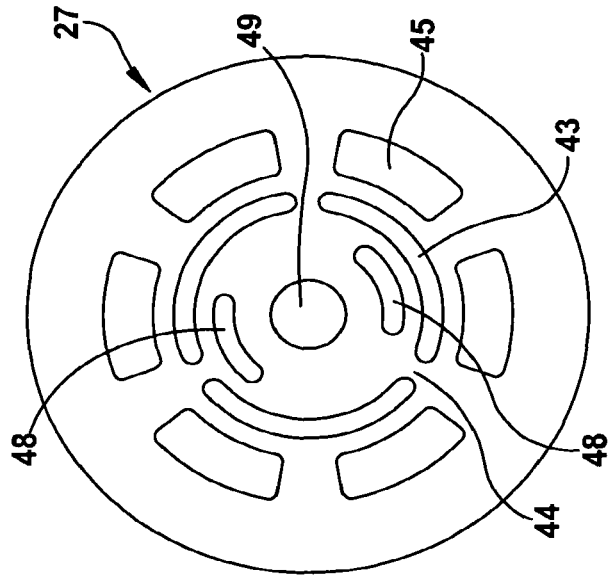
Figure 7D:
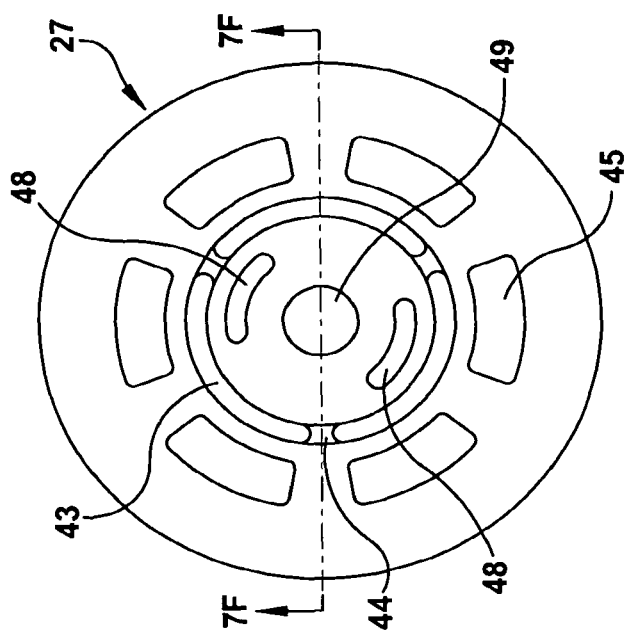
Figure 7F:

FIGS. 7D, 7E, and 7F are upstream, downstream and sectional views of plate 27.

FIGS. 8A, 8B, and 8C are upstream, downstream and sectional views of plate 29.

Figure 9A:
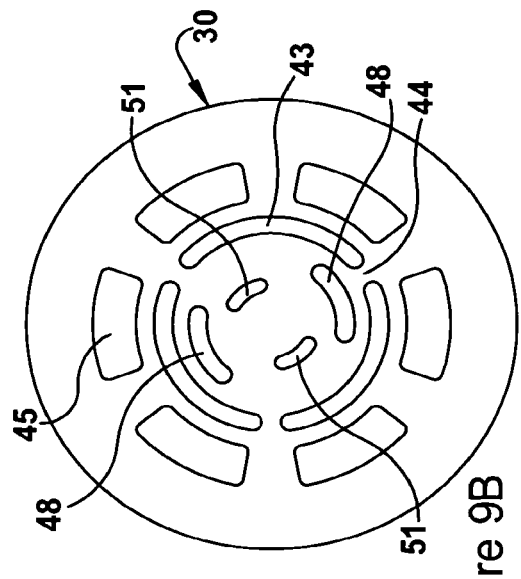
Figure 9B:
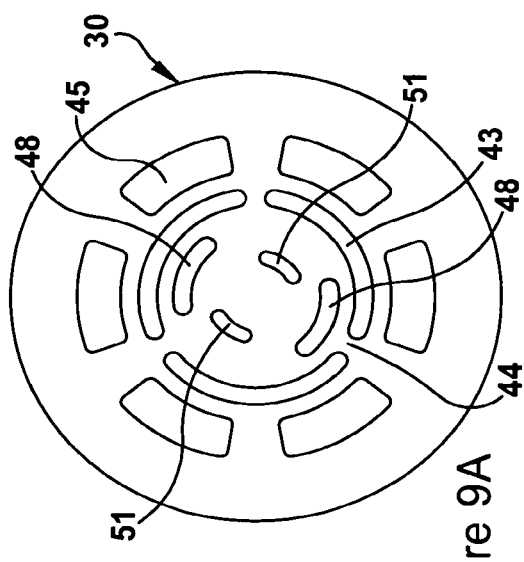

FIGS. 9A and 9B are upstream and downstream views of plate 30.

Figure 10A:
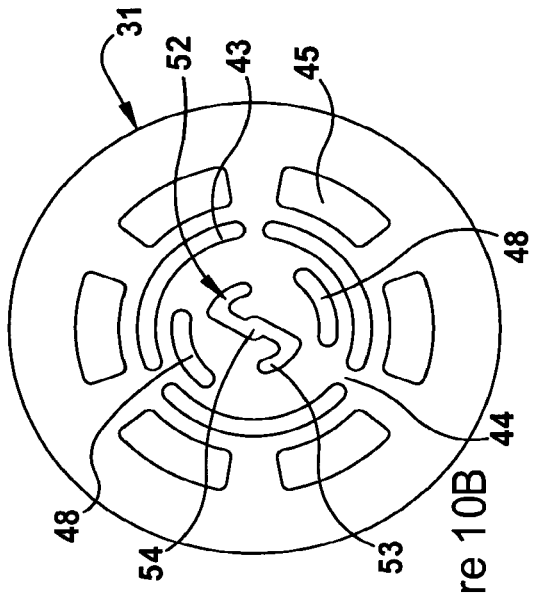
Figure 10B:
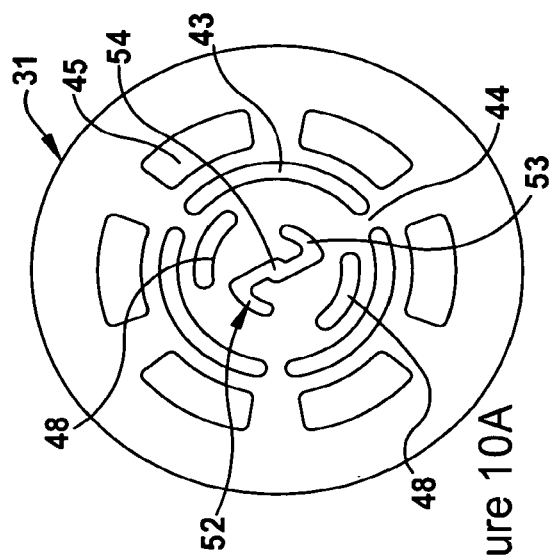

FIGS. 10A and 10B are upstream and downstream views of plate 31.

Figure 11A:
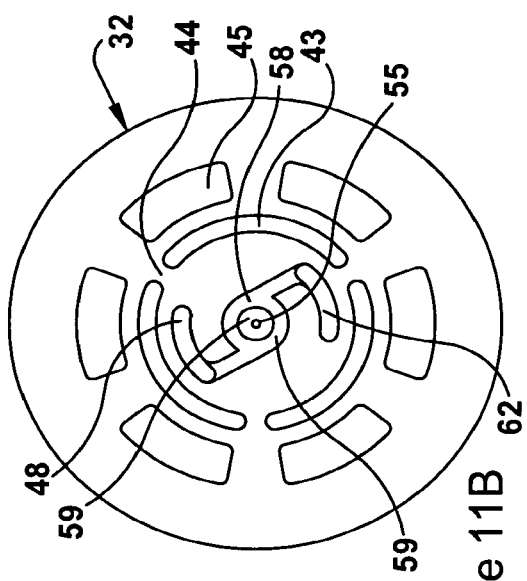
Figure 11B:
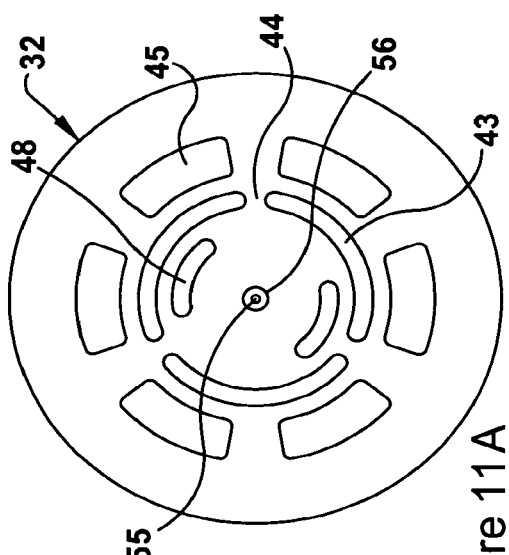

FIGS. 11A and 11B are upstream and downstream views of plate 32.

Figure 12A:
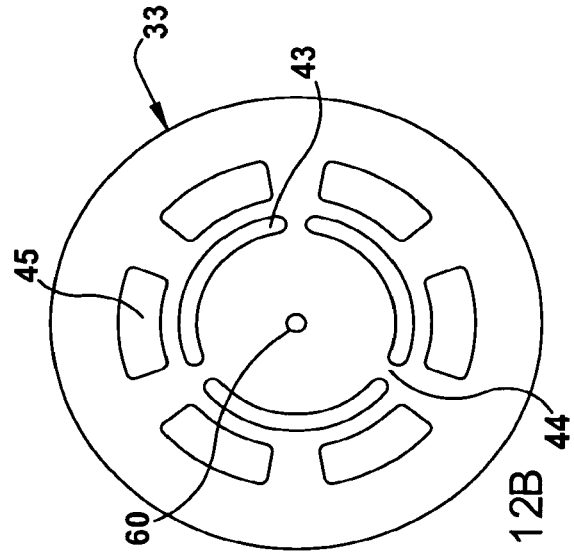
Figure 12B:
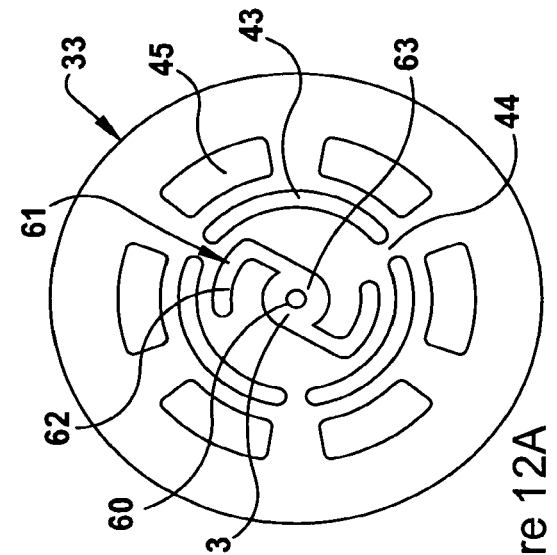

FIGS. 12A and 12B are upstream and downstream views of plate 33.

Figure 13A:
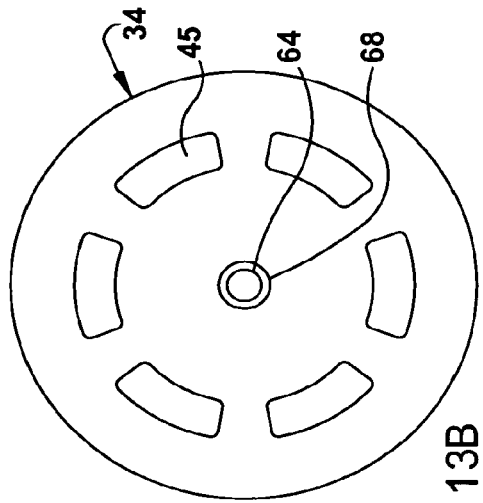
Figure 13B:
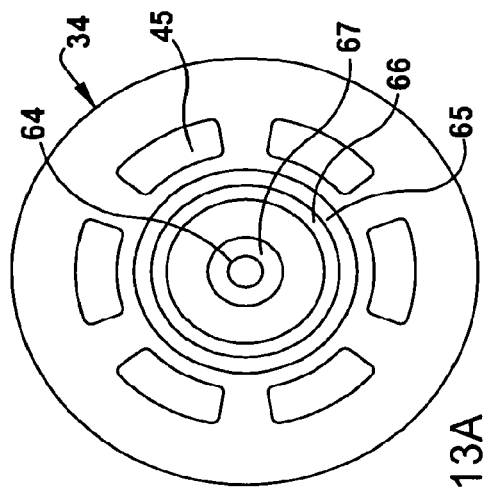

FIGS. 13A and 13B are upstream and downstream views of plate 34.

Figure 14A:
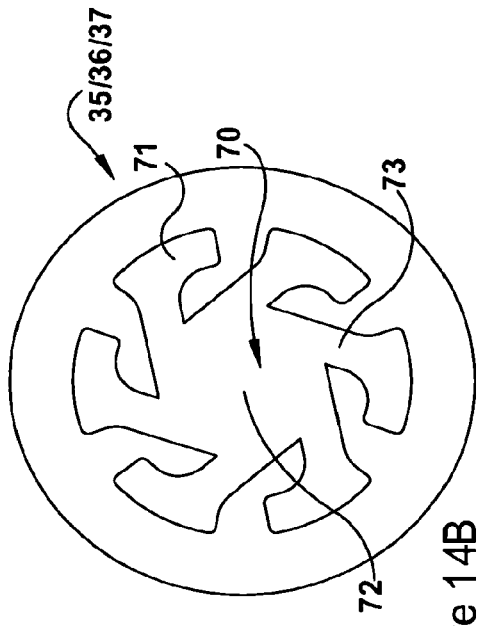
Figure 14B:
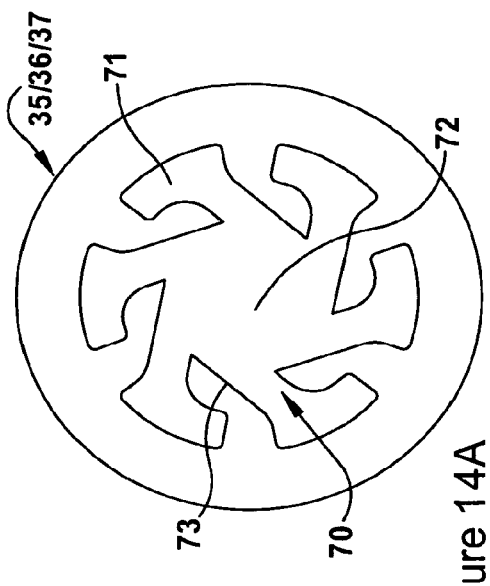

FIGS. 14A and 14B are upstream and downstream views of plate 35/36/37.

Figure 15A:
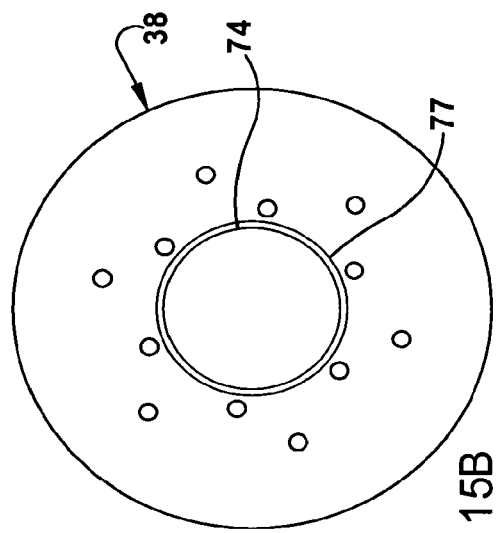
Figure 15B:
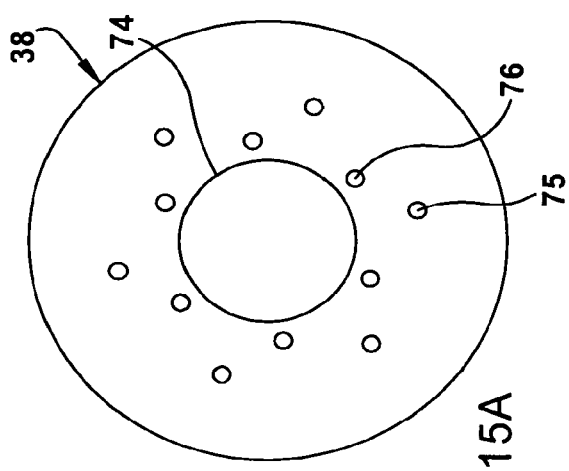

FIGS. 15A and 15B are upstream and downstream views of plate 38.

Figure 16A:
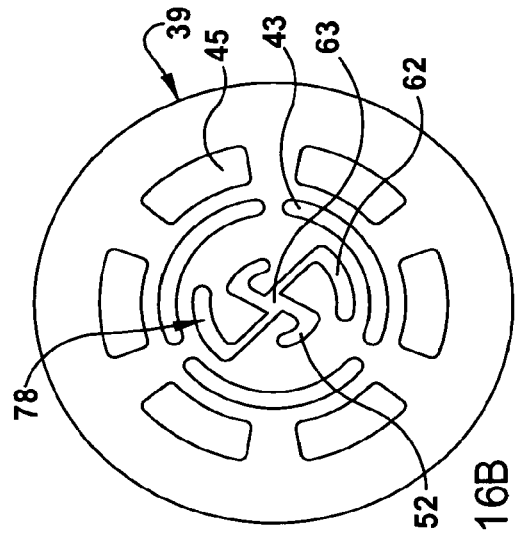
Figure 16B:
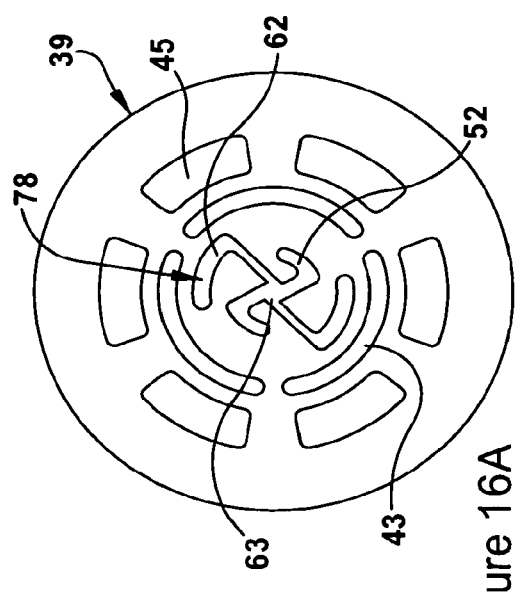

FIGS. 16A and 16B are upstream and downstream views of a plate 39 which can replace plates 31-33 in a modified version of the nozzle 16.

Figure 17:
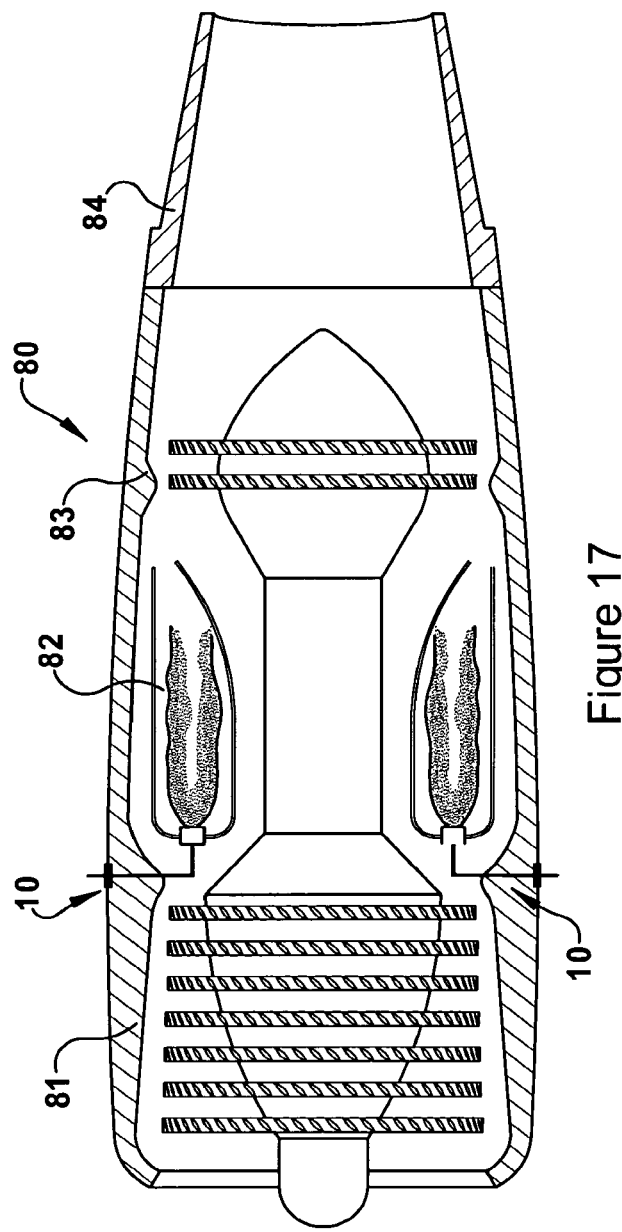

FIG. 17 is schematic illustration of a gas turbine engine 80 incorporating nozzle assemblies 10 according to the present invention as fuel injectors.

Figure 18:
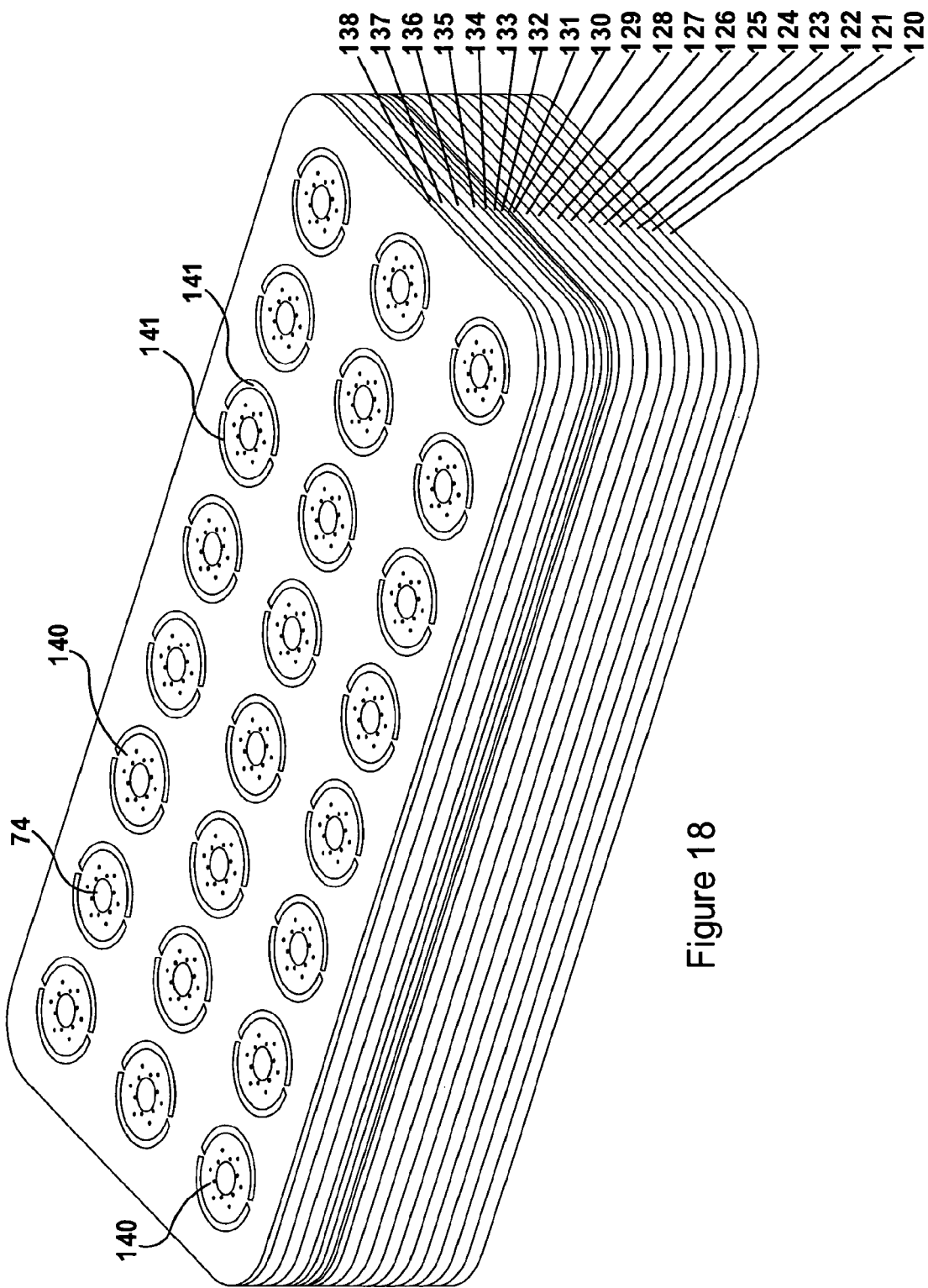

FIG. 18 is schematic view of a stack of sheets 120-138 for making a plurality of the nozzles 16.

DETAILED DESCRIPTION

Referring now to the drawings, and initially to FIGS. 1A and 1B, a nozzle assembly 10 according to the present invention is shown. The nozzle assembly 10 comprises a housing 11, first and second feed tubes 12 and 13, first and second inlet tubes 14 and 15, and a nozzle 16. The first feed tube 12 supplies a first fluid to the first inlet tube 14 and the second feed tube 13 supplies a second fluid to the second inlet tube 15.

In the illustrated embodiment, the first inlet tube 14 extends concentrically with the second inlet tube 15. Fuel within the first inlet tube 14 travels in a circular (in cross-section) flow and fuel within the second inlet tube 15 travels in an annular (in cross-section) flow surrounding the first inlet tube 14. The downstream ends of the inlet tubes 14 and 15 extend within, and are surrounded by, upstream portions of the nozzle 16, with the downstream end of the first inlet tube 14 extending beyond the downstream edge of the second inlet tube 15.

Figure 2A:
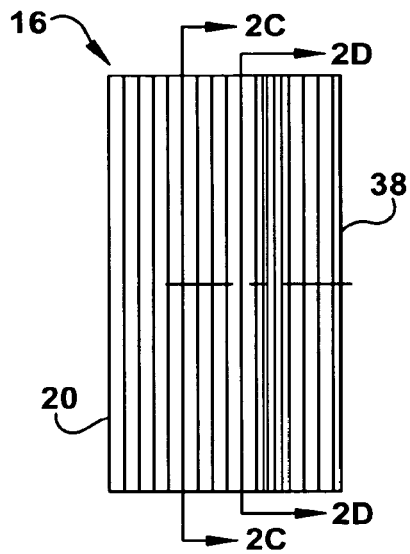
FIGS. 2A, 2B and 2C-2E are upstream, side, and sectional views of the nozzle 16 of the assembly 10.
Figure 2B:
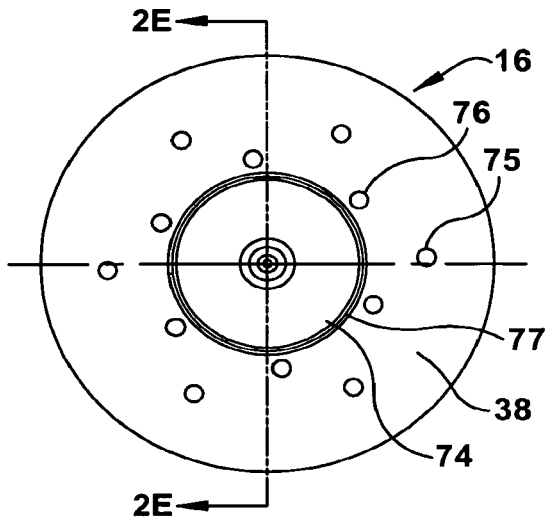
Figure 2C:
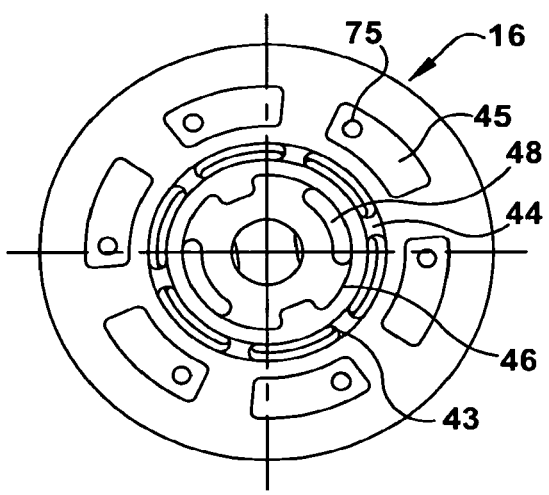
Figure 2D:
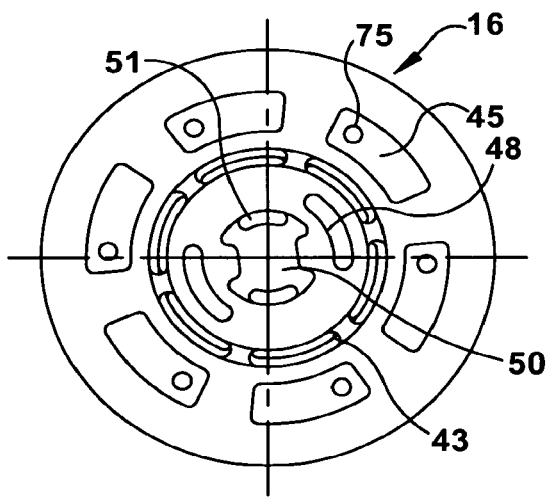
Figure 2E:
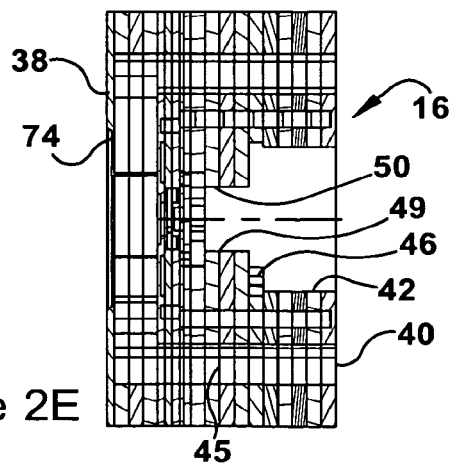
Figure 3:
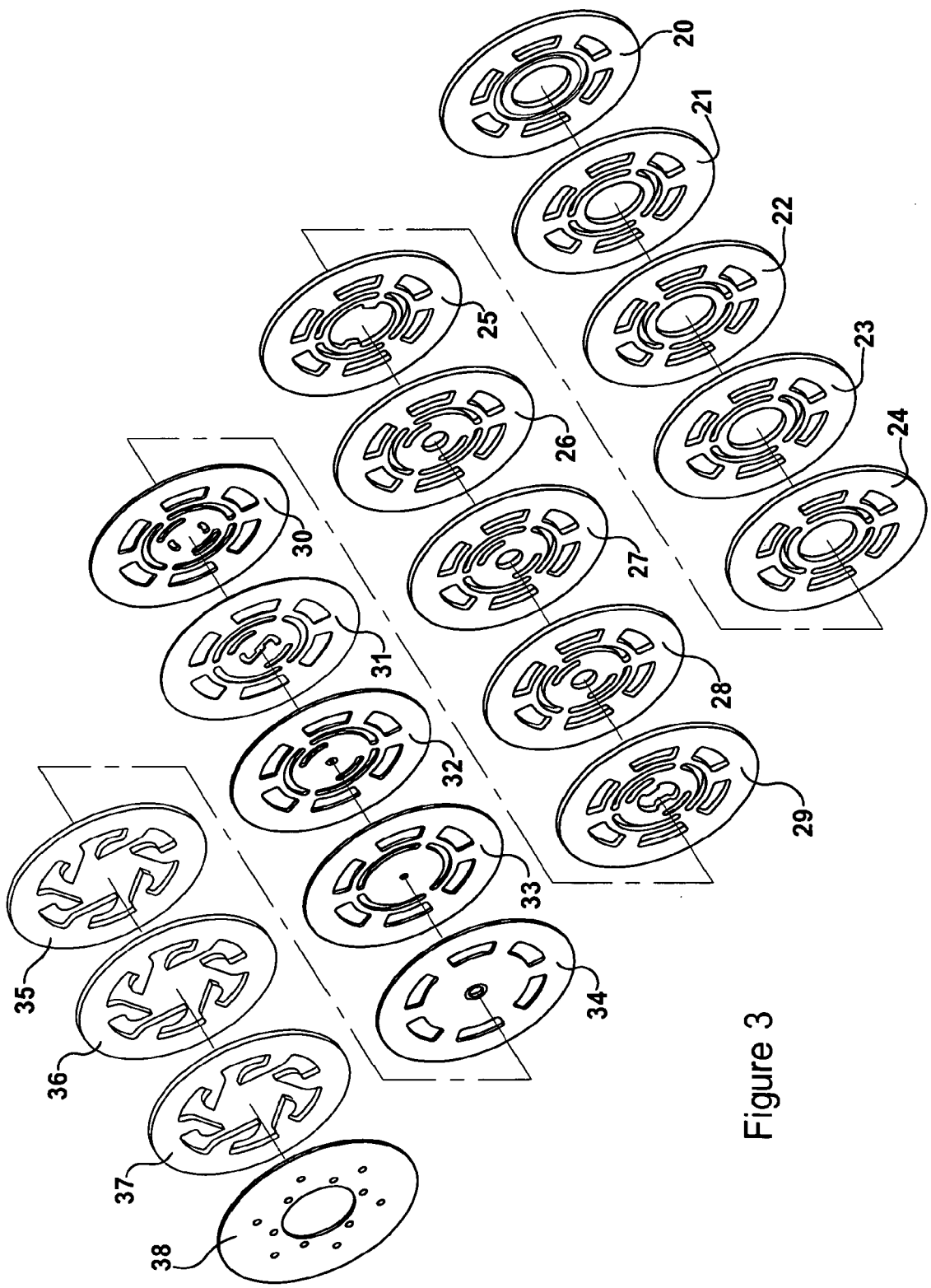
FIG. 3 is an exploded view of the stack of plates 20-38 forming the nozzle 16.

Referring now to FIGS. 2 and 3, the nozzle 16 is shown isolated from the rest of the nozzle assembly 10. The nozzle 16 comprises a stack of plates 20-38 which collectively have a series of openings forming an outlet, inlets, and flow circuits therebetween. The plates can also include grooves which, in combination with the openings, form passageways, orifices, chambers, channels, and/or other flow-defining features of the circuits. For the purposes of the present invention, the term "opening" refers to an aperture that extends through the thickness of the plate, and the term "groove" refers to a recess that extends only partially through the thickness of the plate.

The nozzle 16 preferably includes at last five plates and the plates 20-38 preferably all have the same plan shape which, in the illustrated embodiment is a circle. Each of the plates 20-38 preferably includes at least one opening and has a perimeter edge (e.g., a circumferential edge in a circular plate) that does not form any part of a flow-defining opening and/or groove. In other words, each opening/groove is surrounded by plate material and there are no "open-to-the-edge" openings or grooves. The ungrooved surfaces of the upstream and downstream sides of each plate are preferably planar and parallel, with no projections extending outwardly therefrom.

The diameter or other plan dimensions of the plates 20-38 can be determined by the intended use of the nozzle assembly 10, although size restrictions may often be inherent in the selected forming technique and/or desired flow circuit arrangement. For example, in the illustrated embodiment, the circular plates 20-38 can each have a diameter which is in the range of 0.5 to 1.0 inch and, in any event, less than 3 inches. The nozzle 16 of the present invention is particularly suited for such sized situations, however, smaller or larger nozzles are certainly possible with, and contemplated by, the present invention.

The specific arrangement of the openings and grooves in each of the plates 20-38 can be best seen be referring additionally to FIGS. 4-15. Starting at the upstream end of the nozzle 16, the plate 20 has a plurality (e.g., six) of circumferentially spaced openings 40 and the upstream side of this plate includes a circular groove 41. (FIG. 4.) The plate 20, and also adjacent plates 22-24 each include a central opening 42 which is sized to receive the second (outer) inlet tube 15. (FIGS. 4 and 5.)

The plates 21-33 each include a plurality (e.g., three) of arc-shaped openings 43 arranged in a circular pattern aligned with the circular groove 41 in the plate 20. (FIGS. 5-12.) The openings 43 are separated by connections 44 which are angularly offset (e.g., clocked or staggered) in adjacent plates. (Compare connections in the plates 21, 23, 25, 27, 29, 31, 33 to the connections in the plates 22, 24, 26, 28, 30 and 32.) In the plates 21-29, the connections 44 are notched on the upstream surface of the plate. (FIGS. 5-8.)

The plates 21-34 each include a plurality (e.g., six) of circumferentially spaced openings 45 which align with the openings 40 in the plate 20. (FIGS. 4-13.) In the plates 20-24, the groove 41 and the arc-shaped openings 43 are positioned radially between the openings 42 and the openings 40/45. In addition to the openings 43 and 45, the plate 25 also includes a central opening 46 aligned with the openings 42 in the plates 20-24 and contoured to flange the downstream edge of the second inlet tube 15. (FIG. 6.)

The plates 26-32 each include (in addition to openings 43 and 45), a plurality (e.g., two) of circumferentially spaced openings 48. (FIGS. 7-11.) The openings 48 are aligned with radially outer regions of the flange opening 46 in the plate 25 and are positioned radially inward of the openings 43. The plates 26-28 include (in addition to openings 43, 45 and 48) central openings 49 sized to receive the protruding downstream end of the first inlet tube 14. (FIG. 7.) These openings 49 each has a diameter less than that of the openings 42 in the plates 20-24 and the opening 46 in the plate 25.

As was indicated above, the plates 29-32 each have openings 43, 45 and 48. The plate 29 also includes a central opening 50 aligned with the openings 49 and contoured to flange the downstream edge of the first inlet tube 14. (FIG. 8.) The plate 30 also includes a plurality (e.g., two) of circumferentially spaced openings 51 axially aligned with radially outer regions of the flange opening 50 in the plate 29. (FIG. 9.) The plate 31 also includes a swirl-shaped opening 52 comprising outer segments 53 (aligned with openings 51 in the plate 30) and a central swirl area 54. (FIG. 10.) The plate 32 also includes a central opening 55, a groove 56 on its upstream side, and groove 57 on its downstream side. (FIG. 11.) The size/shape of the groove 56 corresponds to the central swirl area 54 in the plate 31. The groove 57 has a central swirl area 58 which connects with the openings 48 in a pinwheel-like manner and an ungrooved area within the central swirl area 58 forms an island 59 surrounding the opening 55.

In addition to the openings 43 and 45, the plate 33 has a central opening 60 with a greater diameter than the opening 55 in the plate 32. (FIG. 12.) The upstream side of this plate includes a groove 61 having outer segments 62 and a central swirl area 63. The outer segments 62 are aligned with the openings 48 in the plate 32 and the central swirl area 63 is aligned with the central swirl area 58 on the downstream side of the plate 32.

The plate 34 has, in addition to openings 45, a central opening 64 having a cross-sectional area greater than that of the central opening 56 in the plate 33. (FIG. 13.) The upstream side of the plate 34 includes a circular groove 65 and another circular groove 66 is positioned radially inwardly from the groove 65. The groove 65 is aligned with the openings 43 in the plates 21-33 and with the circular groove 41 in the downstream side of the plate 20. The upstream side of the plate 34 further includes a circular groove 67 surrounding the opening 64 and its downstream side has a smaller-diameter groove 68 surrounding the opening 64.

The plates 35-37 each include an opening 70 including a plurality (e.g., six) of radially outer segments 71, a large central swirl area 72, and spoke areas 73. (FIG. 14.) The radially outer segments 71 are aligned with the openings 40/45 in the plates 21-34. The spoke areas 73 connect the segments 71 to the swirl area 72 in a pinwheel-like manner.

The plate 38 includes a large central opening 74 aligned with the swirl area 72. (FIG. 15.) This plate also includes a plurality (e.g., six) of small openings 75 aligned with the segments 71, and a plurality (e.g., six) of small openings 76 aligned with the spokes 73. A circular groove 77 surrounds the opening 74 on the downstream side of the plate 38.

The plates 20-38 are compiled in the stack and joined to form the nozzle 16. To continue the construction of the nozzle assembly 10, the inlet tubes 14 and 15 are joined to the nozzle 16 in a fluid-tight manner so that fluid supplied by the first inlet tube 14 and fluid supplied by the second inlet tube passes through the appropriate openings/grooves in the nozzle 16. The tube-to-nozzle couplings can be accomplished by press-fit, welding, brazing, or any other suitable technique.

In the illustrated embodiment, the second inlet tube 15 is positioned within the sleeve formed by the openings 42 in the plates 20-24 and its downstream edge is flanged by the opening 46 in the plate 25. The downstream edge of the first inlet tube 14 (which extends beyond the downstream edge of the second inlet tube 15) is positioned within the sleeve formed by the openings 49 in the plates 25-28 and its downstream edge is flanged by the opening 50 in the plate 29. Thus, fluid supplied by the first inlet tube 14 will pass through the opening 46 in the plate 25 and fluid supplied by the second inlet tube 15 will pass through the opening 50 in the plate 29. The plates 26-28 are positioned between the plate 25 (with the opening 46) and the plate 29 (with the opening 50).

The opening 74 in the plate 38 defines the nozzle outlet and the openings 70 in the plates 35-37 define a fluid-outlet chamber. A first circuit (containing fluid supplied by the first inlet tube 14) and a second circuit (containing fluid supplied by the second inlet tube 14) each pass through the fluid-outlet chamber prior to being discharged from the nozzle outlet opening 74. The groove 77 surrounding the outlet 74 on the downstream side of the plate 38 encourages the forward flow of the fluid to prevent impingement on the exposed surface of the plate.

The opening 50 in the plate 29 defines a first inlet, and the openings in the plates 30-37 define the first flow circuit from the first inlet 50 to the nozzle outlet 74. Particularly, fluid supplied to the first inlet 50 (e.g., via the first inlet tube 14) will pass through distribution channels formed by the openings 51 in the plate 30, and through the swirl chamber formed by opening 52 in the plate 31 whereat the fluid is directed radially inwardly. From the central swirl area 54 of the chamber, the first fluid passes through the orifice opening 55 in the plate 32 and, with encouragement from the groove 56, forms a tight circular (in cross-section) flow. This fluid flow then passes through the openings 60 and 64 in the plates 33 and 34, into the fluid-outlet chamber formed by the openings 70 in the plates 35-37, and then through the nozzle outlet opening 74 in plate 38.

The opening 46 in the plate 25 defines a second inlet and the plates 26-37 define the second flow circuit from the second inlet opening 46 to the nozzle outlet opening 74. Specifically, a second fluid supplied to the second inlet opening 46 (e.g., via the second inlet tube 15), will pass through distribution channels formed by the openings 48 in the plates 26-32, into the swirl chamber formed by the grooves 57 and 61 in the plates 32 and 33 (whereat the second fluid is directed radially inward), and through the orifice opening 60 in the plate 33. The swirl chamber, with help from the orifice-surrounding island 59 on the downstream side of the plate 32, result in the fluid in the second circuit being directed into an annular (in cross-section) flow as it passes through the orifice 60. The fluid in the second circuit then passes through the opening 64 in the plate 34, into the fluid-outlet chamber, and through the nozzle outlet opening 74. The circular groove 67 on the upstream side of the plate 34 helps to maintain an annular shape of the flow. The groove 68 on the downstream side of the plate 34 encourages flow into the fluid-outlet chamber 70 and/or prevents impingement of this fluid on the plate's downstream face.

Thus, the nozzle 16 is a dual-orifice nozzle having a swirl chamber in the first circuit (formed by the opening 52 in plate 31) and a separate swirl chamber (formed by the grooves 57 and 61 in plates 32 and 33) in the second circuit. When fluid in the second circuit exits its swirl chamber, this annular flow of fluid surrounds the circular flow of fluid in the first circuit as they pass through the openings 60 and 64, the fluid-outlet chamber 70, and the nozzle outlet 74. Once clear of the openings 60 and 64, the flows radially diverge into cone shapes. The fluid exiting the nozzle 16 can have a cone-within-a-cone shape with the fluid in the first circuit occupying the inner cone and the fluid in the second fluid occupying the outer cone. That being said, the inner cone and the outer cone could intermix into a single cone.

The nozzle 16 could instead have a duplex design wherein the fluid in the first circuit and the fluid in the second circuit intermix upstream of the fluid-outlet chamber 70. Specifically, for example, the plates 31-33 could be replaced with a plate 39 (or a plurality of plates 39) such as that shown in FIG. 16. The illustrated plate 39 has (in addition to openings 43 and 45) a "swirl chamber" opening 78. The opening 78 with outer segments 52 (aligned with the openings 51 in the plate 30), outer segments 62 (aligned with the openings 48 in the plates 26-29) and a central swirl area 63 (absent an island 59) to which both the segments 52 and 62 are connected in a pinwheel-like fashion. (See FIG. 16.) The intermixed fluids from the first and second circuits would pass from the swirl area 63 through the opening 64 in the plate 34 into the fluid-outlet chamber 70, and then through the nozzle outlet opening 74 in a single-cone discharge shape.

A plurality (e.g., six) of third inlets are defined by openings 40 in the plate 20 and upstream plates define a plurality of third flow circuits. Particularly, fluid supplied to the third inlets 40 will travel through passages formed by the openings 45 in the plates 21-34, into the fluid-outlet chamber 70. and then through the nozzle outlet 74. While in the illustrated embodiment, there are six inlets 40 and passages 45, the nozzle 16 could instead have less (e.g., only one) or more third inlets and/or third passages. In the per-outlet chamber 70 the fluid in the third circuits is swirled around the annular flow of the second fluid and the circular flow of the first fluid therewithin.

The groove 41 in the downstream side of the plate 20, the openings 43 in the plates 21-33, and the grooves 65 in the upstream side of the plate 34, form a closed coil-shaped chamber. This chamber surrounds the sections of the first circuit and the second circuit upstream from the fluid-outlet chamber 70 and can contain stagnant air or another fluid. The chamber is intended to provide a heat shield function to prevent the fluid supplied to the first circuit and/or the second circuit from reaching elevated temperatures. The notches in connections 44 in the plates 21-29 help minimize the transfer of heat by increasing the air gap between adjacent plates and/or reduce any direct lines of thermal contact to the fluid passages. The "clocking" of the connections 44 in adjacent plates prevents contact between the connections of different plates.

The groove 66 on the upstream side of the plate 34 forms another annular-shaped heat-shield chamber closed by the downstream side of the plate 33. This heat-shield chamber overlies the outer segments of the 62 of the swirl chamber for the second fluid. The separation of the grooves 65 and 66 (resulting in a ridge therebetween) can be provided for structural purpose and/or to allow for proper through-pressure during joining.

Referring now to FIG. 17, a gas turbine engine 80 is shown which uses nozzle assemblies 10 according to the present invention as fuel injectors. The illustrated engine 80 generally comprises a compressor section 81, a combustion chamber 82, a turbine section 83, and an exhaust section 84. The nozzle assemblies 10 are mounted just downstream of the compressor section 81 to direct (or inject) fuel into radial outer regions of the combustion chamber 82. The gas turbine engine 80 can be, for example, an engine in an aircraft, and temperatures within the combustion chamber 82 can reach as high as 1300° F.

In the nozzle assemblies 10 of the gas turbine engine 80 shown in FIG. 17, the fluid supplied to the first circuit can be fuel and the fluid supplied to the second circuit can also be fuel. The two fuels could be the same fuel (e.g., jet fuel supplied from a common tank) so that, for example, the first circuit can be used during start-up or low power conditions and the second circuit can be used in combination with the first circuit for high power conditions. Such a staged fuel supply is a common requirement in gas turbine engines used for aircraft applications.

Alternatively, the fluid for one circuit can be one type of fuel (e.g., diesel fuel) and the fluid for the other circuit can be another type of fuel (e.g., natural gas). Still further, the first (or second) circuit can carry a fuel fluid and the second (or first) circuit can carry a non-fuel fluid. For example, one circuit could carry water for injection into the fuel carried by the other circuit for emission-reducing purposes.

In the illustrated nozzle assembly 10, the fluid supplied to the third circuits is expected to be air surrounding the nozzle 16. When used as a fuel injector, such as is shown in FIG. 17, the air is pushed through the third circuit by compressor-generated pressure at the upstream end of the nozzle 16. While most of the air in the third circuit passes through the fluid-outlet chamber 70, a small percentage of air passes through the openings 75 and 76 in the plate 38. This small passage of air serves to "puff off" and/or "wipe away" fuel residue on the downstream face the nozzle 16. Additionally or alternatively, the expelled air helps to discourage recirculation zones from developing around and outside the desired discharge pattern.

If the first circuit and/or the second circuit carry fuel, the air supplied by the third circuit can be used to atomize the fuel. That being said, the third fluid need not be air and could instead be, for example, other non-fuel fluids (e.g., water) or fuel fluids (e.g., natural gas). If the third fluid is something other than air, additional tubing may be necessary to supply the fluid to the third circuit. Further, the third circuits could be used to supply different fluids to the fluid-outlet chamber (e.g., water in three of the circuits and air in the other three circuits). Moreover, a nozzle 16 without third circuits is possible with, and contemplated by, the present invention.

Referring now to FIG. 18, a stack of sheets 120-138 is shown for making a plurality (e.g., twenty-four) of nozzles 16. The stack of sheets 120-138 comprises a sheet for each plate 20-38 in the nozzle, the sheet being made of the material, and having the thickness of, the respective plate. Each sheet has a plurality (e.g., twenty four) of plate areas 140 having the opening(s) and/or grooves of the corresponding plate. For example, the sheet 138 corresponds to the plate 38 whereby each of its plate areas 140 has an opening 74, small openings 75 and 76 (shown but not numbered in FIG. 18), and a groove 77 (not visible in FIG. 18). For a duplex-design nozzle, the same nozzle-making process can be used except that the sheet(s) corresponding to the plate(s) 39 would replace sheets 131-133.

The sheets 120-138 are stacked in an order corresponding to the order of the plates 20-38 in the nozzle, and in orientation such that the plate areas 140 are aligned. The sheets 120-138 are joined together to form the stack. The plate areas 140 can then be removed (e.g., etched, milled, laser or otherwise cut, electric discharge or otherwise machined, water jet, stamped, etc.) from the rest of the stack to form the individual nozzles 16. To facilitate the separation of the nozzles 16 from the rest of the joined sheet material, the sheets 120-138 can additionally provided with semi-circular slots 141 that almost completely surrounding each of the plate areas 140. These slots 141 can additionally be used for alignment during the sheet-stacking step and/or for alignment during the separating step.

The plates 20-38 and/or sheets 120-138 can be made of any suitable material which, in many cases, will be a metal material. For example, the plates/sheets can be made of stainless steel, nickel-based metals, and/or other ferrous-based metals. Non-ferrous metal materials (e.g., aluminum) and also non-metal materials (e.g., ceramic) could also be candidates for the plate/sheet material. In lower temperature applications, polymer and/or plastic (e.g., thermoplastic) material be used. The plates 20-38 and/or sheets 120-138 can all be made of the same or different material. The selection of materials, and/or the use of the same or different materials, will usually be based on the intended use of the nozzle assembly 10, the technique used to form the openings and grooves in individual plates, and/or the process used to join the plates together.

The plates 20-38 and/or the sheets 120-138 can have the same or different thicknesses, and the plate thickness is selected according to the intended application and/or the technique used to form the openings and grooves. Certain forming techniques may favor as thin a plate as possible. However, lower limits are sometimes imposed by the size and/or placement of the openings and grooves, as the plate material around and between the openings/grooves must be capable of structurally supporting and separating the circuits. For this reason, the plates (and thus corresponding sheets)

containing both openings and grooves must sometimes be thicker than those containing only openings. In the illustrated embodiment, for example, the plates 20-29 (and/or the sheets 120-129) and the plates 35-37 (and/or the sheets 135-157) can be twice as thick as the plates 30, 32-34, and 38 (and/or the sheets 130, 132-134, and 138) and the plate 31 (and/or the sheet 131) can be half as thick as these plates/sheets (e.g., 0.020 inch thick, 0.010 inch thick and 0.005 inch thick). Generally, at least some of the plates 20-38 and/or the sheets 120-138 will be less than about 0.25 inch thick. As mentioned above, the non-grooved surfaces of the upstream and downstream sides of the plates 20-38 and/or the sheets 120-138 will preferably be planar and parallel, with no protrusions to interfere with stacking and/or joining.

The openings and grooves can be formed on the plate material by any suitable method which provides the needed accuracy and/or precision. For example, etching, milling, laser or otherwise cutting, electric discharge or otherwise machining, water jetting and/or stamping can be employed. These and other forming techniques can be used, provided they can provide the precision and/or edge smoothness required.

In some situations, it may be desirable to use different forming methods on different plates/sheets. For example, the openings on the plate 34 (and/or sheet 134) and the plate 36 (and/or sheet 136) may be such that less precision can be tolerate whereby they could be formed by one although other plates/sheets would require the precision provided by another method. Additionally or alternatively, it may be desirable to use different forming methods for different openings or grooves on the same plate/sheet. For example, the semi-circular slots 141 surrounding the plate areas 140 on the sheets 120-138, may not require the same accuracy as the circuit-defining openings whereby these slots could be formed by one method before or after the circuit-defining openings are formed by another method.

Once the openings and/or grooves are formed, the plates 20-38 and/or sheets 120-138 are positioned in face-to-face contact and joined together. The joining process must produce fluid-tight seals not only between adjacent plates, but also around the openings and/or grooves defined by these plates. The joining can be done across the entire surface of the sheets 120-138, or only in the plate areas 140, to form the fluid-tight seals.

Brazing, welding, and diffusion-bonding may be possible methods for joining the plates/sheets together. In certain situations (e.g., lower temperature applications), it may even be possible to use adhesives to join the plates/sheets together, or even accomplish this joining by co-curing if, for example, the plates/sheets are made of a thermoplastic or other curable material. These and other suitable methods can be used, provided they can be accomplished without unacceptable deformation or blocking of the openings/grooves.

The present invention makes it possible for a nozzle manufacturer to stock and use the same sheets (e.g., the sheets 120-130 and the sheets 134-138) for different nozzle designs (e.g., a dual-orifice design and duplex design). Additionally or alternatively, each sheet 120-138 and/or the plate areas 140 thereon can be inspected, and their integrity confirmed, prior to assembly of this particular sheet into the stack. In the event of a "bad batch" of sheets for a particular plate level, only these sheets need be pulled from production, while the rest of the sheets could be used to construct the nozzles 16. In contrast, with conventional machining processes, an error during manufacturing in one region of the nozzle often requires scraping of the entire unit.

One may now appreciate that the present invention provides a nozzle 16 that can be manufactured in an economic and/or replicable manner. Although the invention has been shown and described with respect to certain preferred embodiments, it is obvious that equivalent and obvious alterations and modifications will occur to others skilled in the art upon the reading and understanding of this specification.

The invention claimed is:

1. A nozzle having a first inlet, a second inlet, a nozzle outlet, a first fluid circuit from the first inlet to the nozzle outlet, and a second fluid circuit from the second inlet to the nozzle outlet, said nozzle comprising a stack of plates in face-to-face contact and joined together in a fluid tight manner, said stack of plates including:
   a first-inlet plate having an opening defining the first inlet;
   a second-inlet plate having an opening defining the second inlet;
   a nozzle-outlet plate, positioned downstream of the first-inlet plate and the second-inlet plate, having an opening defining the nozzle outlet; and
   a plurality of plates positioned downstream of the inlet-defining plates and upstream of the nozzle-outlet-defining plate, these plates having grooves and/or openings which define:
      an outlet chamber positioned downstream of the inlets and upstream of the nozzle outlet;
      outer swirl segments in the first circuit positioned downstream of the first inlet and upstream of the outlet chamber;
      outer swirl segments in the second circuit positioned downstream of the second inlet and upstream of the outlet chamber;
      one or more central swirl areas to which the outer swirl segments are connected in a pinwheel fashion; and
      a central orifice from each central swirl area that exits to the outlet chamber, wherein each orifice is substantially smaller in diameter than the outlet chamber;
      wherein the first circuit has a central swirl area to which the first-circuit outer swirl segments connect in a pinwheel fashion and the second circuit has a separate central swirl area to which the second-circuit swirl segments connect in a pinwheel fashion, and wherein the first circuit has a central orifice exiting to the outlet chamber and the second circuit has a separate orifice exiting to the outlet chamber.

2. A nozzle as set forth in claim 1 wherein the stack of plates comprises at least one plate positioned between the first-inlet plate and the second-inlet plate.

3. A nozzle as set forth in claim 1, wherein the stack of plates includes at least five plates and wherein in at least some of the plates are less than about 0.25 inch thick.

4. A nozzle as set forth in claim 1, a first fluid supplied to the first inlet, and a second fluid supplied to the second inlet, wherein both the first fluid and the second fluid are liquid, and wherein at least one of the first fluid or the second fluid is fuel.

5. A nozzle as set forth in claim 1, having a plurality of third inlets and a plurality of third circuits extending from the third inlets to the nozzle outlet, and wherein the stack of plates includes openings forming a radial outer segment and connected spoke area for each third circuit, each spoke area radially exiting into the outlet chamber.

6. A nozzle as set forth in claim 5, a first liquid fluid supplied to the first inlet, a second liquid fluid supplied to the second inlet, and air supplied to the third inlets.

7. A nozzle having a first inlet, a second inlet, a nozzle outlet, a first fluid circuit from the first inlet to the nozzle outlet, and a second fluid circuit from the second inlet to the nozzle outlet, said nozzle comprising a stack of plates in face-to-face contact and joined together in a fluid tight manner, said stack of plates including:

a first-inlet plate having an opening defining the first inlet;

a second-inlet plate having an opening defining the second inlet;

a nozzle-outlet plate, positioned downstream of the first-inlet plate and the second-inlet plate, having an opening defining the nozzle outlet; and a plurality of plates positioned downstream of the inlet-defining plates and upstream of the nozzle-outlet-defining plate, these plates having grooves and/or openings which define:

an outlet chamber positioned downstream of the inlets and upstream of the nozzle outlet;

outer swirl segments in the first circuit positioned downstream of the first inlet and upstream of the outlet chamber;

outer swirl segments in the second circuit positioned downstream of the second inlet and upstream of the outlet chamber;

one or more central swirl areas to which the outer swirl segments are connected in a pinwheel fashion; and a central orifice from each central swirl area that exits to the outlet chamber, wherein each orifice is substantially smaller in diameter than the outlet chamber; wherein the first circuit and the second circuit have a common swirl area to which the first-circuit outer segments and the second-circuit outer segments both connect in a pinwheel fashion, and wherein the first circuit and the second circuit share a central orifice exiting to the outlet chamber.

8. A nozzle as set forth in claim 7, wherein the stack of plates comprises at least one plate positioned between the first-inlet plate and the second-inlet plate.

9. A nozzle as set forth in claim 7, wherein the stack of plates includes at least five plates and wherein in at least some of the plates are less than about 0.25 inch thick.

10. A nozzle as set forth in claim 7, a first fluid supplied to the first inlet, and a second fluid supplied to the second inlet, wherein both the first fluid and the second fluid are liquid, and wherein at least one of the first fluid or the second fluid is fuel.

11. A nozzle as set forth in claim 7, having a plurality of third inlets and a plurality of third circuits extending from the third inlets to the nozzle outlet, and wherein the stack of plates includes openings forming a radial outer segment and connected spoke area for each third circuit, each spoke area radially exiting into the outlet chamber.

12. A nozzle as set forth in claim 11, a first liquid fluid supplied to the first inlet, a second liquid fluid supplied to the second inlet, and air supplied to the third inlets.

13. In combination, a gas turbine engine and a plurality of the nozzles set forth in claim 1, wherein the gas turbine engine comprises a combustion chamber and wherein the nozzles are mounted to inject fuel into the combustion chamber.

14. In combination, a gas turbine engine and a plurality of the nozzles set forth in claim 7, wherein the gas turbine engine comprises a combustion chamber and wherein the nozzles are mounted to inject fuel into the combustion chamber.

\* \* \* \* \*

UNITED STATES PATENT AND TRADEMARK OFFICE
CERTIFICATE OF CORRECTION

Page 1 of 1

PATENT NO. : 8,464,539 B2
APPLICATION NO. : 12/365378
DATED : June 18, 2013
INVENTOR(S) : Robert R. Pelletier et al.

It is certified that error appears in the above-identified patent and that said Letters Patent is hereby corrected as shown below:

Title page, Item (63), Related U.S. Application Data should be added:
-- Related U.S. Application Data
(63) Patent Application No. 11/274,811 filed on November 15, 2005, which claims priority under 35 U.S.C. § 119(e) to U.S. Provisional Patent Application No. 60/719,619 filed on September 22, 2005. --

Signed and Sealed this
Fifth Day of November, 2013

Teresa Stanek Rea
*Deputy Director of the United States Patent and Trademark Office*